(12) United States Patent
Fukuoka et al.

(10) Patent No.: US 7,532,726 B2
(45) Date of Patent: May 12, 2009

(54) ENCRYPTION/DECRYPTION DEVICE AND METHOD, ENCRYPTION DEVICE AND METHOD, DECRYPTION DEVICE AND METHOD, AND TRANSMISSION/RECEPTION APPARATUS

(75) Inventors: Toshihiko Fukuoka, Osaka (JP); Taemi Wada, Osaka (JP)

(73) Assignee: Panasonic Corporation, Osaka (JP)

( * ) Notice: Subject to any disclaimer, the term of this patent is extended or adjusted under 35 U.S.C. 154(b) by 772 days.

(21) Appl. No.: 10/523,720

(22) PCT Filed: Aug. 8, 2003

(86) PCT No.: PCT/JP03/10186

§ 371 (c)(1),
(2), (4) Date: Feb. 7, 2005

(87) PCT Pub. No.: WO2004/015916

PCT Pub. Date: Feb. 19, 2004

(65) Prior Publication Data

US 2005/0286720 A1  Dec. 29, 2005

(30) Foreign Application Priority Data

Aug. 8, 2002 (JP) ............................. 2002-231284

(51) Int. Cl.
*H04L 9/28* (2006.01)
*H04L 9/00* (2006.01)
*G06F 11/30* (2006.01)

(52) U.S. Cl. .................... 380/255; 380/28; 380/29; 713/150; 713/189

(58) Field of Classification Search ......... 713/150–154, 713/160–167, 189–193; 380/28–30, 266–283
See application file for complete search history.

(56) References Cited

U.S. PATENT DOCUMENTS

| 4,791,669 | A | | 12/1988 | Kage |
| 5,070,528 | A | * | 12/1991 | Hawe et al. ................. 713/161 |
| 5,438,596 | A | * | 8/1995 | Sugita ........................ 375/140 |
| 5,835,599 | A | | 11/1998 | Buer |
| 7,184,549 | B2 | * | 2/2007 | Sorimachi et al. ............. 380/37 |

FOREIGN PATENT DOCUMENTS

| JP | 07-261662 A | | 10/1995 |
| JP | 09-212457 A | | 8/1997 |
| JP | 10-215244 A | | 8/1998 |
| JP | 2000-075785 A | * | 3/2000 |
| JP | 2001-177514 A | | 6/2001 |
| JP | 2001-177518 A | * | 6/2001 |
| JP | 2002-297030 | | 10/2002 |

* cited by examiner

*Primary Examiner*—Kimyen Vu
*Assistant Examiner*—Darren Schwartz
(74) *Attorney, Agent, or Firm*—McDermott Will & Emery LLP

(57) ABSTRACT

The encryption/decryption device includes: a data structure analysis block for receiving encrypted data or data to be encrypted and outputting control data and also the encrypted data or the data to be encrypted as processing block input data; a data control block for determining a mode selection signal according to the control data; and a shared processing block for performing encryption or decryption for the processing block input data and outputting the result. The shared processing block is configured to have the ability to perform encryption and decryption in either of the CBC mode and the CFB mode by performing ECB processing using input key data, and performs encryption or decryption in the mode indicated by the mode selection signal.

13 Claims, 6 Drawing Sheets

FIG. 4

| | DEC-CBC Init | DEC-CBC Normal | DEC-CFB Init | DEC-CFB Normal | ENC-CBC Init | ENC-CBC Normal | ENC-CFB Init | ENC-CFB Normal |
|---|---|---|---|---|---|---|---|---|
| FIRST SELECTOR | PD | PD | PD | PD | EC | EC | PD | PD |
| SECOND SELECTOR | IV | ECD | IV | EC | IV | PDD | IV | EC |
| THIRD SELECTOR | EC | EC | EC | ECD | ER | ER | EC | PDD |
| FOURTH SELECTOR | ER | ER | ER | ER | PD | PD | ER | ER |

# ENCRYPTION/DECRYPTION DEVICE AND METHOD, ENCRYPTION DEVICE AND METHOD, DECRYPTION DEVICE AND METHOD, AND TRANSMISSION/RECEPTION APPARATUS

TECHNICAL FIELD

The present invention relates to a technology of encryption and decryption.

BACKGROUND ART

In an interactive cable television (CATV) system, which is a representative example of digital interactive communications, TV terminals are equipped with an encryption facility to implement the encryption function. For the encryption function, used is a scheme combining a secret key cryptographic scheme represented by the Data Encryption Standard (DES) and a public key cryptographic scheme represented by Rivest-Shamir-Adleman (RSA) cryptography.

The secret key cryptographic scheme is a scheme using a common key for both encryption and decryption, in which decryption is performed by executing an encryption algorithm in reverse order using the key used for encryption, to obtain the pre-encrypted original text. This scheme, which is implemented with a simple exclusive-OR (XOR) repeating algorithm, permits high-speed processing, but has a problem that both the transmitter and receiver sides must possess the common key and thus delivery/holding of the key is difficult.

The public key cryptographic scheme uses a function, called a trapdoor function, which can be easily computed but of which inverse is extremely difficult to compute, and uses different keys for encryption and decryption. In this scheme, therefore, while delivery/holding of the keys are easy, computation is complicated compared with the secret key cryptographic scheme. Hence, it takes longer time to perform encryption/decryption compared with the secret key cryptographic scheme. It is however possible to make full use of the advantages of the above two schemes. That is, the public key cryptographic scheme may be used for verification and key delivery, and the secret key cryptographic scheme may be used for encryption of data.

In the DES cryptographic scheme, which is a US standard scheme, computation of an input data size of 64 bits and an output data size of 64 bits is performed as the basic processing. In this cryptographic scheme, if only a distribution of the frequencies of occurrences of characters or words is statistically processed in advance for an encryption algorithm, a pre-encrypted plaintext may possibly be estimated by performing matching of a frequency distribution of a character string pattern in an acquired ciphertext with the previously-obtained frequency distribution.

To overcome the above problem, invented was a method of computing XOR of an encrypted 64-bit cipher block and next input 64-bit data and preparing a ciphertext. The cipher mode using this method is called Cipher Block Chaining (CBC) mode. There are cases, such as packet communications, that the data unit used for communications is determined in advance. When the block encryption scheme handling 64 bits as one block is adopted in such cases, odd data failing to reach one block will be produced if a data unit indivisible by the number of bits of one block (64 bits) is input.

If data has an odd portion, XOR is executed between the decrypted result of the immediately preceding block and the odd data, to perform encryption. Cipher Feedback (CFB) mode is a mode suitable for such odd processing. By adopting the CFB mode, a ciphertext can be produced even from data of less than 64 bits.

In both encryption and decryption computation, 56-bit data is normally used as a key. Under specific conditions, however, there is a mode using 40-bit data as a key. In this mode, the valid data of the key is 40 bits although computation itself is performed in 64-bit units as in other modes.

As described above, in computation in the secret key cryptographic scheme, there exist modes corresponding to respective combinations between each one of the plurality of modes of operation, that is, the ECB mode, the CBC mode and the CFB mode and each one of the 56-bit key mode and the 40-bit key mode. To ensure the security function of the digital interactive communications, encryption devices or decryption devices supporting all of these modes are generally used.

A related technology is disclosed in U.S. Pat. No. 5,835,599, for example.

Problems to be Solved

The conventional encryption devices or decryption devices based on the DES cryptographic scheme, provided with respective circuits for the plurality of modes, select one of the plurality of modes properly according to the request of the system, and perform encryption or decryption computation using the circuit for the selected mode.

In recent years, however, systems requiring encryption or decryption seldom use a single key, but increasingly use a plurality of keys and perform computations corresponding to the respective keys.

To meet the above tendency, a device must be provided with the function of performing computations corresponding to the plurality of keys, in addition to the encryption or decryption function for each mode. The resultant device will be enormous in circuit scale. In general, computations for a plurality of keys must be executed in parallel. Hence, with increase of the number of keys with which processing is required, the device must have processing circuits of the number corresponding to the number of keys.

In the DES modes, processing modified from the basic processing of DES, called ECB processing, is performed. Also, the modes are hardly executed in parallel simultaneously. In view of these, in encryption devices and decryption devices, it is possible to share processing circuits in a plurality of modes to reduce the circuit scale.

DISCLOSURE OF THE INVENTION

An object of the present invention is providing an encryption/decryption device, an encryption device, a decryption device and a transmission/reception apparatus, in which processing circuits are shared in a plurality of cipher modes to thereby reduce the circuit scale.

The encryption/decryption device of the present invention includes: a data structure analysis block for receiving encrypted data or data to be encrypted, analyzing the structure of the data and outputting information related to encryption as control data, the data structure analysis block also outputting the encrypted data or the data to be encrypted as processing block input data; a data control block for outputting an encryption/decryption switch signal indicating which one of encryption and decryption should be performed, and a mode selection signal indicating in which mode the processing block input data should be processed, according to the control data; and a shared processing block for performing encryption or decryption for the processing block input data according to the encryption/decryption switch signal, and outputting encrypted result or decrypted result, wherein the shared processing block is configured to have the ability to perform encryption and decryption in either of the Cipher Block Chaining (CBC) mode and the Cipher Feedback (CFB) mode by performing Electronic Code Book (ECB) processing using input key data, and performs encryption or decryption in the mode indicated by the mode selection signal.

According to the invention described above, the shared processing block can perform encryption and decryption in a plurality of cipher modes, and this eliminates the necessity of providing a processing circuit for each cipher mode. It is therefore possible to reduce the circuit area of the encryption/decryption device and thus minimize the cost thereof.

The encryption device of the present invention includes: a data structure analysis block for receiving data to be encrypted, analyzing the structure of the data to determine control data and outputting the control data, the data structure analysis block also outputting the data to be encrypted as processing block input data; a data control block for outputting a mode selection signal indicating in which mode the processing block input data should be processed, according to the control data; and a shared processing block for performing encryption for the processing block input data and outputting encrypted result, wherein the shared processing block is configured to have the ability to perform encryption in either of the CBC mode and the CFB mode by performing ECB processing using input key data, and performs encryption in the mode indicated by the mode selection signal.

The decryption device of the present invention includes: a data structure analysis block for receiving encrypted data, analyzing the structure of the data and outputting information related to encryption as control data, the data structure analysis block also outputting the encrypted data as processing block input data; a data control block for outputting a mode selection signal indicating in which mode the processing block input data should be processed, according to the control data; and a shared processing block for performing decryption for the processing block input data and outputting decrypted result, wherein the shared processing block is configured to have the ability to perform decryption in either of the CBC mode and the CFB mode by performing ECB processing using input key data, and performs decryption in the mode indicated by the mode selection signal.

The transmission/reception apparatus of the present invention includes: a downstream PHY section for converting a received signal into data and outputting the converted data; a downstream data processing section for separating downstream data and key data from the received data and outputting the resultant data; a first encryption/decryption device for decrypting the downstream data using the key data and outputting the decrypted data; a storage section for storing the decrypted downstream data; a second encryption/decryption device for encrypting upstream data read from the storage section and outputting the encrypted data; an upstream data processing section for adding key data used for the encryption to the encrypted upstream data and outputting the resultant data; and an upstream PHY section for converting the data output from the upstream data processing section into a signal and transmitting the signal, wherein both the first and second encryption/decryption devices comprise: a data structure analysis block for receiving the downstream data including encrypted data or the upstream data including data to be encrypted, analyzing the structure of the data and outputting information related to encryption as control data, the data structure analysis block also outputting the encrypted data or the data to be encrypted as processing block input data; a data control block for outputting an encryption/decryption switch signal indicating which one of encryption and decryption should be performed, and a mode selection signal indicating in which mode the processing block input data should be processed, according to the control data; and a shared processing block for performing encryption or decryption for the processing block input data according to the encryption/decryption switch signal, and outputting encrypted result or decrypted result, wherein the shared processing block is configured to have the ability to perform encryption and decryption in either of the CBC mode and the CFB mode by performing ECB processing using input key data, and performs encryption or decryption in the mode indicated by the mode selection signal.

Effect of the Invention

As described above, according to the present invention, since encryption/decryption can be performed in many modes with the same hardware, the circuit area can be reduced and thus the cost can be minimized. With the ability of providing many functions at low cost, the cost performance of an encryption/decryption device and the like can be enhanced.

BRIEF DESCRIPTION OF THE DRAWINGS

FIG. 4 is a view illustrating combinations of data selected by first to fourth selectors in the shared processing block in FIG. 1.

BEST MODE FOR CARRYING OUT THE INVENTION

Embodiments of the present invention will be described with reference to the relevant drawings.

Figure 1:
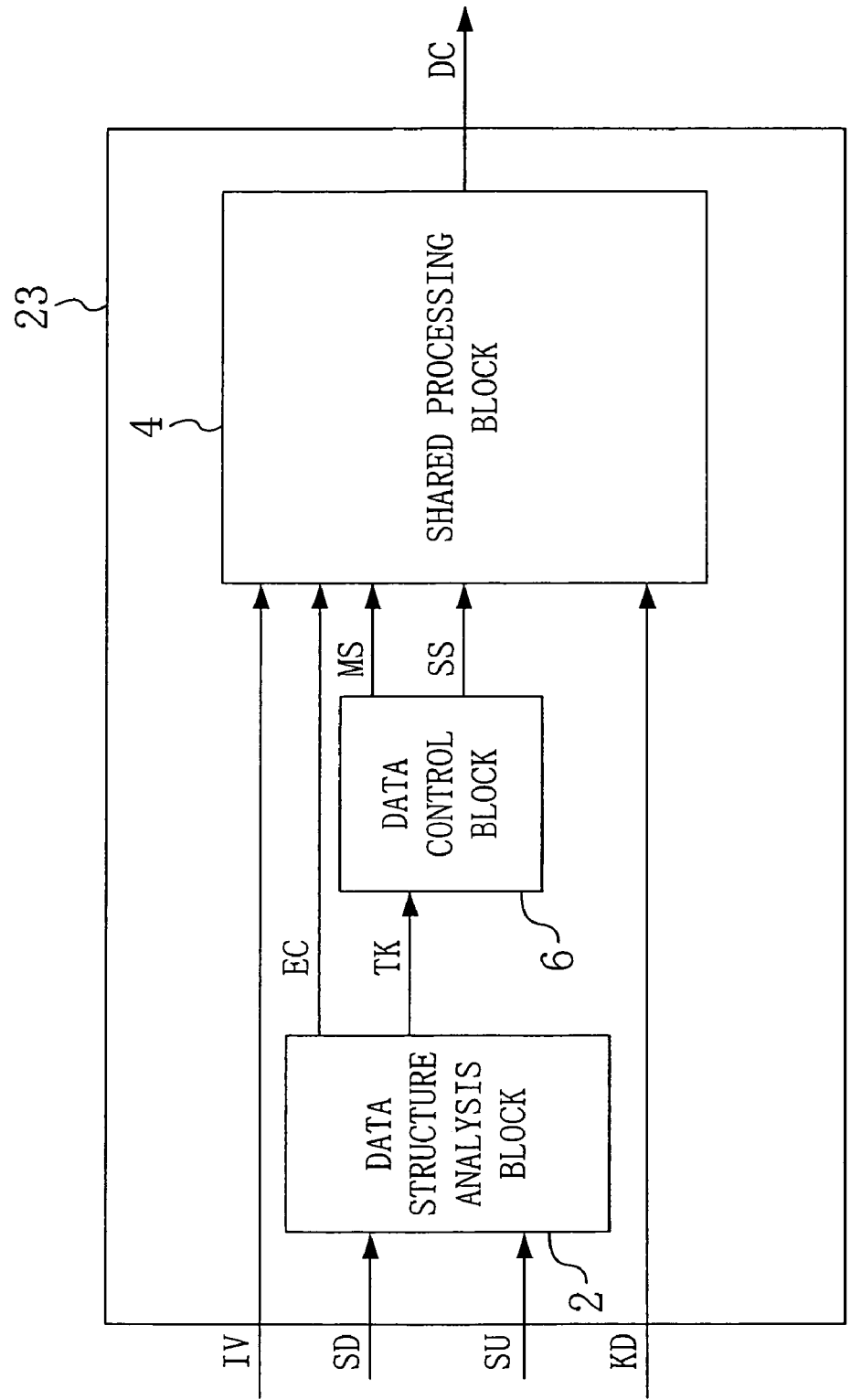
FIG. 1 is a block diagram of an encryption/decryption device of an embodiment of the present invention.

FIG. 1 is a block diagram of an encryption/decryption device of an embodiment of the present invention. The encryption/decryption device of FIG. 1, denoted by 23, includes a data structure analysis block 2, a shared processing block 4 and a data control block 6. Herein, as an example, the encryption/decryption device 23 of FIG. 1 is described as being incorporated in one of terminals in an interactive communications network that is composed of a center unit and a plurality of terminals. Alternatively, the encryption/decryption device 23 may be incorporated in the center unit. The center unit transmits downstream data SD including encrypted data to the terminal. The downstream data SD includes video data and transmission control data. Also, the terminal receives upstream data including data to be encrypted, encrypts the data and transmits the data to the center unit.

The data structure analysis block 2 receives downstream data SD and executes syntactic analysis of the data. The downstream data SD has a Moving Picture Experts Group (MPEG) structure for video data and a Media Access Control (MAC) structure as a sublayer for network processing embedded in the MPEG structure, for example.

The data structure analysis block 2 first analyzes the header portion of the MPEG structure data to extract information for drawing out the MAC structure data, and draws out the MAC structure data. The data structure analysis block 2 then analyzes the header portion of the MAC structure data, and, if finding existence of an extended field called an extension header in addition to the normal header, analyzes the extension header. The extension header, which enables extension of the data structure, has information on whether or not encryption has been made and information required to perform processing for encryption or decryption.

If no extension header exists, the data structure analysis block 2 determines that the downstream data SD has not been encrypted. In this case, the data structure analysis block 2 fixes traffic encryption key (TEK) control data TK at value "0", for example, and outputs the data to the data control block 6.

If an extension header exists, the data structure analysis block 2 analyzes the field that holds information related to encryption. If determining that no encryption has been made, the data structure analysis block 2 follows the processing performed when no extension header exists. If determining that encryption has been made, the data structure analysis block 2 extracts service ID (SID) and the key sequence number as the information related to encryption from the extension header, and outputs the extracted information to the data control block 6 as the TEK control data TK.

The data structure analysis block 2 also receives data to be encrypted as upstream data SU and analyzes the structure of the data. The data structure analysis block 2 extracts SID and the key sequence number from data included in the upstream data SU, and outputs the extracted data to the data control block 6 as the TEK control data TK.

The data structure analysis block 2 outputs the MPEG-structure encrypted data included in the downstream data SD or the data to be encrypted included in the upstream data SU to the shared processing block 4 as processing block input data EC.

The data structure analysis block 2 counts the number of bits in a packet of the received downstream data SD or upstream data SU, to determine whether the number of bits in a packet of the stream is less than 64 bits, a multiple of 64 bits or the sum of a multiple of 64 bits and an odd less than 64 bits, and also determine the number of bits (packet count) output as the processing block input data EC in the packet. The data structure analysis block 2 outputs the determined results, as well as notification that the data should be decrypted in the case of receiving the downstream data SD or that the data should be encrypted in the case of receiving the upstream data SU, to the data control block 6 as the TEK control data TK.

The data control block 6 performs processing using the TEK control data TK received from the data structure analysis block 2. Specifically, the data control block 6 first checks the SID and the key sequence number to determine whether or not these numbers are predetermined valid numbers. If they are determined to be invalid numbers, no processing is performed. If determining that they are valid numbers, the data control block 6 checks for whether or not the 56-bit key mode is adopted. Although a 56-bit key is normally used for encryption and decryption, a key having a length other than 56 bits may also be used. Assume herein that a 56-bit key or a 40-bit key is used as an example. Whether or not the 56-bit key mode is adopted uniquely corresponds to the SID and the key sequence number. The data control block 6 outputs information indicating whether or not the 56-bit key mode is adopted as a mode selection signal MS.

The data control block 6 outputs an encryption/decryption switch signal SS indicating which one of encryption and decryption should be performed to the shared processing block 4, according to the TEK control data TK. The data control block 6 also outputs a signal indicating the CFB mode if the number of bits in a packet of the processing block input data EC is less than 64 bits, or a signal indicating the CBC mode if it is a multiple of 64 bits, to the shared processing block 4 as the mode selection signal MS, based on the TEK control data TK.

If the number of bits in a packet is the sum of a multiple of 64 bits and an odd less than 64 bits, the data control block 6 switches the mode selection signal MS according to the packet count in the following manner. That is, the data control block 6 outputs the signal indicating the CBC mode when the data structure analysis block 2 is outputting the processing block input data EC equivalent to a multiple of 64 bits, or outputs the signal indicating the CFB mode when the data structure analysis block 2 is outputting the processing block input data EC equivalent to an odd less than 64 bits, as the mode selection signal MS. The data control block 6 also outputs information on whether each mode is in the initial state at the start of the mode or in the subsequent steady state as the mode selection signal MS.

The data structure analysis block 2 notifies the data control block 6 of whether or not the received downstream data SD or upstream data SU should be processed in the ECB mode, determined according to the data, by means of the TEK control data TK. If processing in the ECB mode should be made, the data control block 6 outputs a signal indicating the ECB mode as the mode selection signal MS.

As described above, the data control block 6 switches the mode selection signal MS according to the SID, the key sequence number, the packet count and the like, and outputs the resultant signal to the shared processing block 4.

The shared processing block 4 is used in common for processing in the plurality of cipher modes. Specifically, the shared processing block 4 is configured to have the ability to encrypt and decrypt the processing block input data EC in any of the ECB mode, the CBC mode and the CFB mode, by performing ECB processing using externally-input initial vector data IV and key data KD. The shared processing block 4 performs encryption or decryption according to the encryption/decryption switch signal SS in the mode indicated by the mode selection signal MS, and outputs the encrypted or decrypted result as processed data DC.

Figure 2:
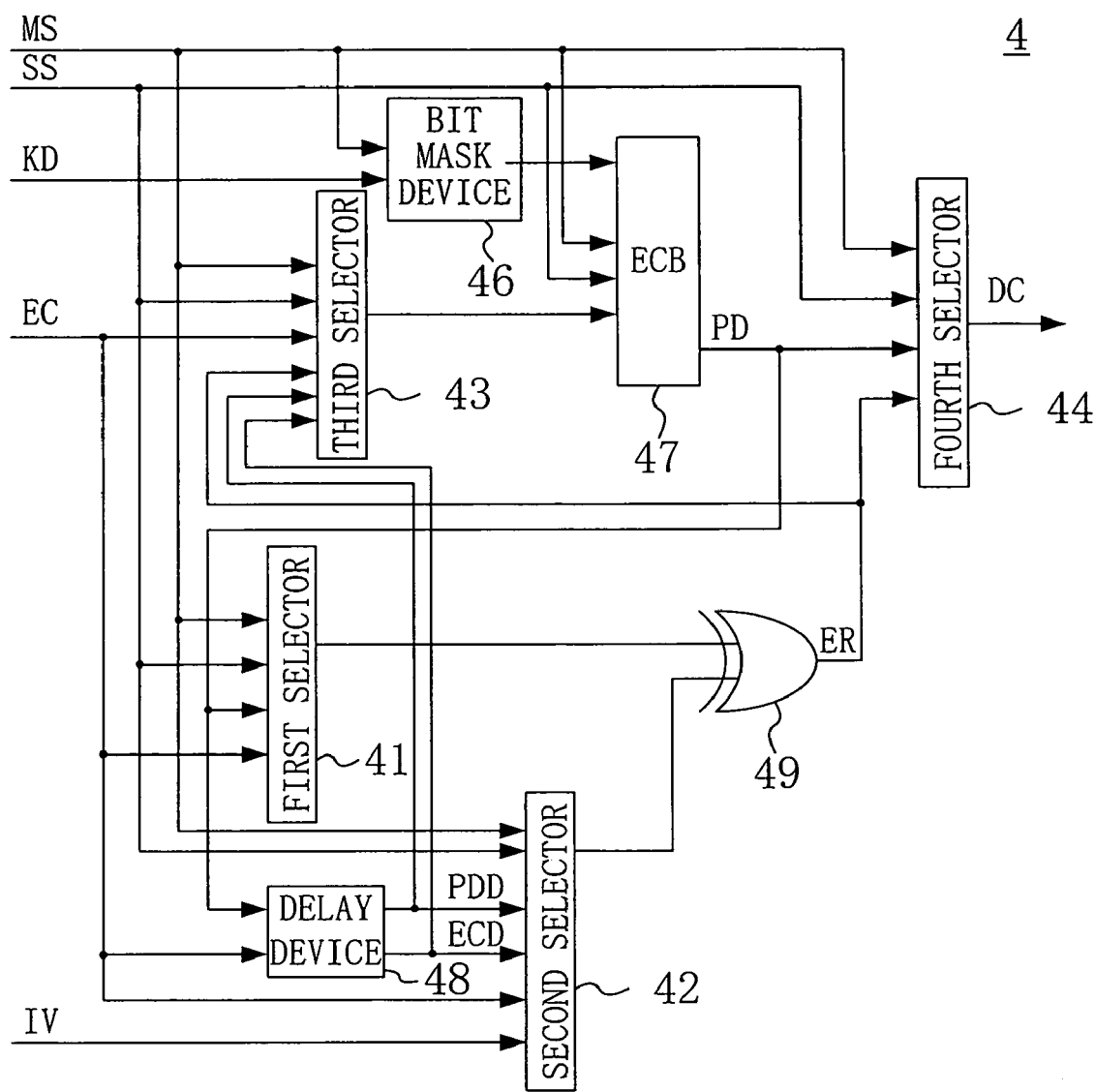
FIG. 2 is a block diagram of an example of a shared processing block in FIG. 1.

FIG. 2 is a block diagram showing an example of the shared processing block 4 in FIG. 1. The shared processing block 4 of FIG. 2 includes a first selector 41, a second selector 42, a third selector 43, a fourth selector 44, a bit mask device 46, an ECB processor 47, a delay device 48 and an XOR operator 49.

The first selector 41 selects one of the processing block input data EC and cipher-processed data PD output from the ECB processor 47 according to the encryption/decryption switch signal SS and the mode selection signal MS, and outputs the selected data to the XOR operator 49.

The delay device 48, receiving the processing block input data EC and the cipher-processed data PD, delays these data items by the time required for the ECB processor 47 to perform ECB processing for 64-bit data, and outputs the delayed data to the second selector 42.

The second selector 42 selects one of the processing block input data EC, the initial vector data IV, and delayed processing block input data ECD and delayed cipher-processed data PDD output from the delay device 48 according to the encryption/decryption switch signal SS and the mode selection signal MS, and outputs the selected data to the XOR operator 49.

The XOR operator 49 computes XOR of the output of the first selector 41 and the output of the second selector 42 for each corresponding bit, and outputs the result to the fourth selector 44.

The third selector 43 selects one of the processing block input data EC, XOR data ER output from the XOR operator 49, the delayed processing block input data ECD and the delayed cipher-processed data PDD according to the encryption/decryption switch signal SS and the mode selection signal MS, and outputs the selected data to the ECB processor 47.

The bit mask device 46 masks part of the key data KD as required according to the mode selection signal MS, and outputs the result to the ECB processor 47 as mode-adaptive key data.

The fourth selector 44 selects one of the cipher-processed data PD and the XOR data ER output from the XOR operator 49 according to the encryption/decryption switch signal SS and the mode selection signal MS, and outputs the selected data as the encrypted result or the decrypted result.

The ECB processor 47 performs either encryption or decryption for the output of the third selector 43 as the ECB processing according to the encryption/decryption switch signal SS and the mode selection signal MS. The ECB processor 47 uses the mode-adaptive key data output from the bit mask device 46 to perform the ECB processing, and outputs the result to the first selector 41, the fourth selector 44 and the delay device 48 as the cipher-processed data PD.

Figure 3:
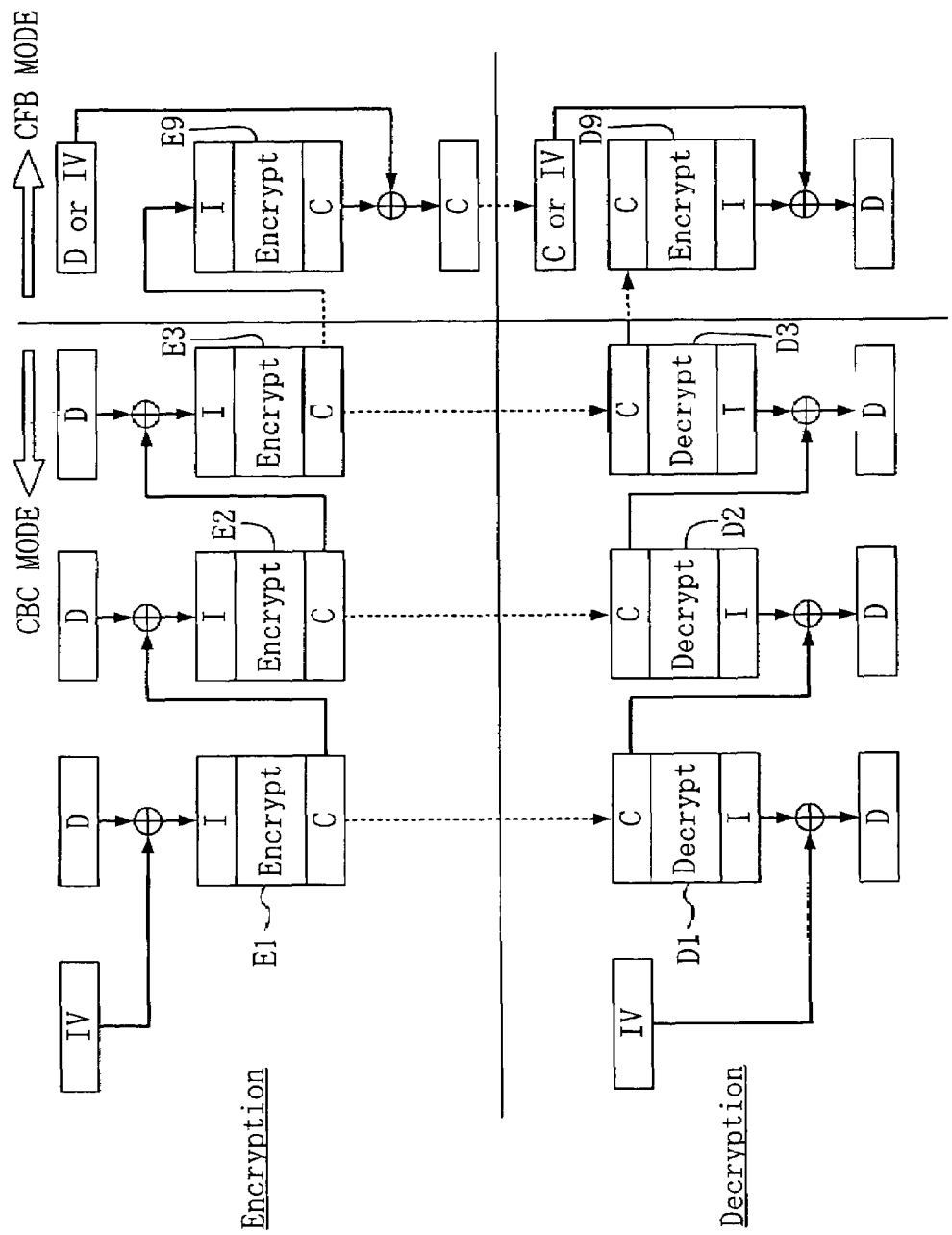
FIG. 3 is a view illustrating a flow of processing performed in the shared processing block in FIG. 1.

FIG. 3 is a view illustrating a flow of processing performed by the shared processing block 4 in FIG. 1. In FIG. 3, the upper and lower parts respectively show a flow of encryption and a flow of decryption. Processing items E1, E2, E3, E9, D1, D2, D3 and D9 respectively indicate ECB processing. In both encryption and decryption, the shared processing block 4 performs CBC-mode processing continuously when CBC-mode processing is necessary, and thereafter performs CFB-mode processing as required.

In FIG. 3, the processing in the rightmost column including the processing items E9 and D9 is CFB-mode processing, and the processing in the other three columns including the processing items E1, E2, E3, D1, D2 and D3 is CBC-mode processing. "IV" represents initial vector data, "D" represents non-encrypted data, and "I" represents pre-ECB processed data for the encryption in the upper part of FIG. 3 and post-ECB processed data for the decryption in the lower part of FIG. 3. "C" represents encrypted data, "Encrypt" represents that the ECB processing in the ECB processor 47 is encryption, and "Decrypt" represents that the ECB processing in the ECB processor 47 is decryption. Although key data is used in the actual ECB processing, the flow of key data is omitted in FIG. 3. The flow of processing in FIG. 3 applies irrespective of whether or not the 56-bit key mode is adopted.

FIG. 4 is a view illustrating combinations of data selected by the first to fourth selectors 41 to 44 in the shared processing block 4 in FIG. 1. The operation of the shared processing block 4 during decryption will be described with reference to FIG. 2, the lower part of FIG. 3 and FIG. 4. In this operation, the encryption/decryption switch signal SS received by the shared processing block 4 indicates decryption. The operation will be described in individual cases separated depending on the 56-bit key mode or not, the CBC mode or the CFB mode, and the initial state or the steady state. The ECB processing by the ECB processor 47 is decryption in the CBC mode and encryption in the CFB mode.

1) Case of 56-bit key mode and initial state in CBC mode (DEC-CBC Init in FIG. 4)

In this case, the processing D1 in the lower part of FIG. 3 and the subsequent processing of computing XOR are performed. The shared processing block 4 performs "Decrypt" processing as the ECB processing for input encrypted data C to obtain data I. The shared processing block 4 then computes XOR of the obtained data I and the initial vector data IV and outputs the result as non-encrypted data D.

The above processing will be described with reference to FIG. 2. A signal indicating the 56-bit key mode and the initial state in the CBC mode is input into the shared processing block 4 as the mode selection signal MS.

The first selector 41 selects the cipher-processed data PD output from the ECB processor 47 and outputs the selected data. The second selector 42 selects the initial vector data IV and outputs the selected data. The XOR operator 49 computes XOR of the cipher-processed data PD and the initial vector data IV for each corresponding bit and outputs the resultant XOR data ER.

The third selector 43 selects the processing block input data EC and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs decryption as the ECB processing for the processing block input data EC output from the third selector using the 56-bit key data output from the bit mask device 46, and outputs the resultant cipher-processed data PD. The fourth selector 44 selects the XOR data ER output from the XOR operator 49 and outputs the decrypted result as the processed data DC.

2) Case of 56-bit key mode and steady state in CBC mode (DEC-CBC Normal in FIG. 4)

In this case, the processing D2 or D3 in the lower part of FIG. 3 and the subsequent processing of computing XOR are performed. The shared processing block 4 performs "Decrypt" processing for input encrypted data C to obtain data I. The shared processing block 4 then computes XOR of the obtained data I and the encrypted data C used in the preceding ECB processing, and outputs the result as non-encrypted data D.

The above processing will be described with reference to FIG. 2. A signal indicating the 56-bit key mode and the steady state in the CBC mode is input into the shared processing block 4 as the mode selection signal MS.

The first selector 41 selects the cipher-processed data PD output from the ECB processor 47 and outputs the selected data. The second selector 42 selects the delayed processing block input data ECD output from the delay device 48 and outputs the selected data. The XOR operator 49 computes XOR of the cipher-processed data PD and the delayed processing block input data ECD for each corresponding bit and outputs the resultant XOR data ER.

The third selector 43 selects the processing block input data EC and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs decryption as the ECB processing for the processing block input data EC output from the third selector using the 56-bit key data output from the bit mask device 46, and outputs the resultant cipher-processed data PD. The fourth selector 44 selects the XOR data ER output from the XOR operator 49 and outputs the decrypted result as the processed data DC.

3) Case of non-56-bit key mode and initial state in CBC mode

4) Case of non-56-bit key mode and steady state in CBC mode

These cases are the same as the cases 1) and 2), respectively, except for the following. That is, a signal indicating that the 56-bit key mode is not adopted is input into the shared processing block 4 as the mode selection signal MS. The bit mask device 46, receiving the signal indicating that the 56-bit key mode is not adopted as the mode selection signal MS, masks unnecessary bits (for example, higher-order 16 bits) among the input 56-bit key data KD, and outputs the resultant data to the ECB processor 47 as 40-bit key data. The ECB processor 47 performs the ECB processing using the 40-bit key data output from the bit mask device 46.

5) Case of 56-bit key mode and initial state in CFB mode (DEC-CFB Init in FIG. 4)

Processing in the initial state in the CFB mode is performed when only CFB-mode processing is performed. In this case, the processing D9 in the lower part of FIG. 3 and the subsequent processing of computing XOR are performed. The shared processing block 4 performs "Encrypt" processing for input encrypted data C to obtain data I. The shared processing block 4 then computes XOR of the obtained data I and the input initial vector data IV, and outputs the result as non-encrypted data D.

The above processing will be described with reference to FIG. 2. A signal indicating the 56-bit key mode and the initial state in the CFB mode is input into the shared processing block 4 as the mode selection signal MS.

The first selector 41 selects the cipher-processed data PD output from the ECB processor 47 and outputs the selected data. The second selector 42 selects the initial vector data IV and outputs the selected data. The XOR operator 49 computes XOR of the cipher-processed data PD and the initial vector data IV for each corresponding bit and outputs the resultant XOR data ER.

The third selector 43 selects the processing block input data EC and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the processing block input data EC output from the third selector using the 56-bit key data output from the bit mask device 46, and outputs the resultant cipher-processed data PD. The fourth selector 44 selects the XOR data ER output from the XOR operator 49 and outputs the decrypted result as the processed data DC.

6) Case of 56-bit key mode and steady state in CFB mode (DEC-CFB Normal in FIG. 4)

Processing in the steady state in the CFB mode is performed when CFB-mode processing is performed in succession to CBC-mode processing. In this case, the processing D9 in the lower part of FIG. 3 and the subsequent processing of computing XOR are performed. The shared processing block 4 performs "Encrypt" processing for input encrypted data C used in the preceding ECB processing to obtain data I. The shared processing block 4 then computes XOR of the obtained data I and coming encrypted data C and outputs the result as non-encrypted data D.

The above processing will be described with reference to FIG. 2. A signal indicating the 56-bit key mode and the steady state in the CFB mode is input into the shared processing block 4 as the mode selection signal MS.

The first selector 41 selects the cipher-processed data PD output from the ECB processor 47 and outputs the selected data. The second selector 42 selects the processing block input data EC and outputs the selected data. The XOR operator 49 computes XOR of the cipher-processed data PD and the processing block input data EC for each corresponding bit and outputs the resultant XOR data ER.

The third selector 43 selects the delayed processing block input data ECD output from the delay device 48 and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the delayed processing block input data ECD output from the third selector using the 56-bit key data output from the bit mask device 46, and outputs the resultant cipher-processed data PD. The fourth selector 44 selects the XOR data ER output from the XOR operator 49 and outputs the decrypted result as the processed data DC.

7) Case of non-56-bit key mode and initial state in CFB mode

8) Case of non-56-bit key mode and steady state in CFB mode

These cases are the same as the cases 5) and 6), respectively, except for the following. That is, a signal indicating that the 56-bit key mode is not adopted is input into the shared processing block 4 as the mode selection signal MS. The bit mask device 46, receiving the signal indicating that the 56-bit key mode is not adopted as the mode selection signal MS, masks unnecessary bits (for example, higher-order 16 bits) among the input 56-bit key data KD, and outputs the resultant data to the ECB processor 47 as 40-bit key data. The ECB processor 47 performs the ECB processing using the 40-bit key data output from the bit mask device 46.

Next, the operation of the shared processing block 4 during encryption will be described with reference to FIG. 2, the upper part of FIG. 3 and FIG. 4. In this operation, the encryption/decryption switch signal SS received by the shared processing block 4 indicates encryption. The operation will be described in individual cases separated depending on the 56-bit key mode or not, the CBC mode or the CFB mode, and the initial state or the steady state. The ECB processing by the ECB processor 47 is encryption in both the CBC mode and the CFB mode.

9) Case of 56-bit key mode and initial state in CBC mode (ENC-CBC Init in FIG. 4)

In this case, the processing E1 in the upper part of FIG. 3 and the preceding processing of computing XOR are performed. The shared processing block 4 computes XOR of the input initial vector data IV and non-encrypted data D and outputs the result as data I. The shared processing block 4 then performs "Encrypt" processing as the ECB processing for the resultant data I to obtain encrypted data C, and outputs the data.

The above processing will be described with reference to FIG. 2. A signal indicating the 56-bit key mode and the initial state in the CBC mode is input into the shared processing block 4 as the mode selection signal MS.

The first selector 41 selects the processing block input data EC and outputs the selected data. The second selector 42 selects the initial vector data IV and outputs the selected data. The XOR operator 49 computes XOR of the processing block input data EC and the initial vector data IV for each corresponding bit and outputs the resultant XOR data ER.

The third selector 43 selects the XOR data ER and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the XOR data ER using the 56-bit key data output from the bit mask device 46, and outputs the resultant cipher-processed data PD. The fourth selector 44 selects the cipher-processed data PD and outputs the encrypted result as the processed data DC.

10) Case of 56-bit key mode and steady state in CBC mode (ENC-CBC Normal in FIG. 4)

In this case, the processing E2 or E3 in the upper part of FIG. 3 and the preceding processing of computing XOR are performed. The shared processing block 4 computes XOR of non-encrypted data D and encrypted Data C obtained in the preceding ECB processing and outputs the result as data I. The shared processing block 4 then performs "Encrypt" processing as the ECB processing for the resultant data I to obtain encrypted data C, and outputs the data.

The above processing will be described with reference to FIG. 2. A signal indicating the 56-bit key mode and the steady state in the CBC mode is input into the shared processing block 4 as the mode selection signal MS.

The first selector 41 selects the processing block input data EC and outputs the selected data. The second selector 42 selects delayed cipher-processed data PDD output from the delay device 48 and outputs the selected data. The XOR operator 49 computes XOR of the processing block input data EC and the delayed cipher-processed data PDD for each corresponding bit and outputs the resultant XOR data ER.

The third selector 43 selects the XOR data ER and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the XOR data ER output from the third selector using the 56-bit key data output from the bit mask device 46, and outputs the resultant cipher-processed data PD. The fourth selector 44 selects the cipher-processed data PD and outputs the encrypted result as the processed data DC.

11) Case of non-56-bit key mode and initial state in CBC mode

12) Case of non-56-bit key mode and steady state in CBC mode

These cases are the same as the cases 9) and 10), respectively, except for the following. That is, a signal indicating that the 56-bit key mode is not adopted is input into the shared processing block 4 as the mode selection signal MS. The bit mask device 46, receiving the signal indicating that the 56-bit key mode is not adopted as the mode selection signal MS, masks unnecessary bits (for example, higher-order 16 bits) among the input 56-bit key data KD, and outputs the resultant data to the ECB processor 47 as 40-bit key data. The ECB processor 47 performs the ECB processing using the 40-bit key data output from the bit mask device 46.

13) Case of 56-bit key mode and initial state in CFB mode (ENC-CFB Init in FIG. 4)

Processing in the initial state in the CFB mode is performed when only CFB-mode processing is performed. In this case, the processing E9 in the upper part of FIG. 3 and the subsequent processing of computing XOR are performed. The shared processing block 4 performs "Encrypt" processing for input non-encrypted data D. The shared processing block 4 then computes XOR of the data obtained in the above processing and the input initial vector data IV, and outputs the result as encrypted data C.

The above processing will be described with reference to FIG. 2. A signal indicating the 56-bit key mode and the initial state in the CFB mode is input into the shared processing block 4 as the mode selection signal MS.

The first selector 41 selects the cipher-processed data PD output from the ECB processor 47 and outputs the selected data. The second selector 42 selects the initial vector data IV and outputs the selected data. The XOR operator 49 computes XOR of the cipher-processed data PD and the initial vector data IV for each corresponding bit and outputs the resultant XOR data ER.

The third selector 43 selects the processing block input data EC and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the processing block input data EC output from the third selector using the 56-bit key data output from the bit mask device 46, and outputs the resultant cipher-processed data. PD. The fourth selector 44 selects the XOR data ER output from the XOR operator 49 and outputs the encrypted result as the processed data DC.

14) Case of 56-bit key mode and steady state in CFB mode (ENC-CFB Normal in FIG. 4)

Processing in the steady state in the CFB mode is performed when CFB-mode processing is performed in succession to CBC-mode processing. In this case, the processing E9 in the upper part of FIG. 3 and the subsequent processing of computing XOR are performed. The shared processing block 4 performs "Encrypt" for encrypted data C obtained in the preceding ECB processing. The shared processing block 4 then computes XOR of the data obtained in the above processing and non-encrypted Data D and outputs the result as encrypted data C.

The above processing will be described with reference to FIG. 2. A signal indicating the 56-bit key mode and the steady state in the CFB mode is input into the shared processing block 4 as the mode selection signal MS.

The first selector 41 selects the cipher-processed data PD output from the ECB processor 47 and outputs the selected data. The second selector 42 selects the processing block input data EC and outputs the selected data. The XOR operator 49 computes XOR of the cipher-processed data PD and the processing block input data EC for each corresponding bit and outputs the resultant XOR data ER.

The third selector 43 selects the delayed cipher-processed data PDD output from the delay device 48 and outputs the selected data to the ECB processor 47. The bit mask device 46, receiving the mode selection signal MS indicating the 56-bit key mode, outputs the received 56-bit key data KD to the ECB processor 47 as it is without masking.

The ECB processor 47 performs encryption as the ECB processing for the delayed cipher-processed data PDD output from the third selector using the 56-bit key data output from the bit mask device 46, and outputs the resultant cipher-processed data PD. The fourth selector 44 selects the XOR data ER output from the XOR operator 49 and outputs the encrypted result as the processed data DC.

15) Case of non-56-bit key mode and initial state in CFB mode

16) Case of non-56-bit key mode and steady state in CFB mode

These cases are the same as the cases 13) and 14), respectively, except for the following. That is, a signal indicating that the 56-bit key mode is not adopted is input into the shared processing block 4 as the mode selection signal MS. The bit mask device 46, receiving the signal indicating that the 56-bit key mode is not adopted as the mode selection signal MS, masks unnecessary bits (for example, higher-order 16 bits) among the input 56-bit key data KD, and outputs the resultant data to the ECB processor 47 as 40-bit key data. The ECB processor 47 performs the ECB processing using the 40-bit key data output from the bit mask device 46.

If the mode selection signal MS indicates the ECB mode, the third selector 43 selects the processing block input data EC and outputs the selected data, and the fourth selector 44 selects the cipher-processed data PD and outputs the selected data. The ECB processor 47 performs encryption if the encryption/decryption switch signal SS indicates encryption and performs decryption if it indicates decryption. That is to say, the encryption/decryption device of FIG. 1 can perform encryption and decryption in the ECB mode, in addition to the CBC mode and the CFB mode.

Key data having a length other than 56 bits and 40 bits can also be easily made usable.

The encryption/decryption device of FIG. 1 may be made adaptive as an encryption device. In this case, it is only necessary to encrypt input downstream data and output the result. Any configuration and operation related to decryption described above is unnecessary. The encryption/decryption switch signal SS is unnecessary. The first to fourth selectors and the ECB processor are only required to operate according to the mode selection signal MS.

More specifically, the delay device delays the input cipher-processed data PD and outputs the delayed data. The second selector selects one of the processing block input data EC, the initial vector data IV, and the delayed cipher-processed data PDD output from the delay device, and outputs the selected data. The third selector outputs one of the processing block input data EC, the XOR data ER output from the XOR operator, and the delayed cipher-processed data PDD, and outputs the selected data. The fourth selector selects one of the cipher-processed data PD and the XOR data ER and outputs the results as the encryption results.

Likewise, the encryption/decryption device of FIG. 1 may be made adaptive as a decryption device. In this case, it is only necessary to decrypt input upstream data and output the result. Any configuration and operation related to encryption described above is unnecessary. Therefore, the first selector that always outputs the cipher-processed data PD and the fourth selector that always outputs the XOR data ER output from the XOR operator are unnecessary. Also, the encryption/decryption switch signal SS is unnecessary. The second and third selectors and the ECB processor are only required to operate according to the mode selection signal MS.

More specifically, the delay device delays the input processing block input data EC and outputs the delayed data. The second selector selects one of the processing block input data EC, the initial vector data IV, and the delayed processing block input data ECD output from the delay device, and outputs the selected data. The third selector selects one of the processing block input data EC and the delayed processing block input data ECD, and outputs the selected data. The XOR operator computes XOR of the cipher-processed data PD and the output of the second selector, and outputs the results as the decrypted result.

The present invention can also be implemented by software processing using a processor such as CPU and a digital signal processor (DSP).

As described above, according to the encryption/decryption device of the present invention, by only changing the mode selection signal, encrypted data can be decrypted to obtain decrypted data in any of modes corresponding to respective combinations between each one of the ECB mode, the CBC mode and the CFB mode and each one of the 56-bit key mode and the 40-bit key mode, with the same hardware.

Also, by only changing the encryption/decryption switch signal, both encryption and decryption of data can be performed with the same hardware in any of the modes. This enables reduction in the circuit scale of the encryption/decryption device.

Figure 5:
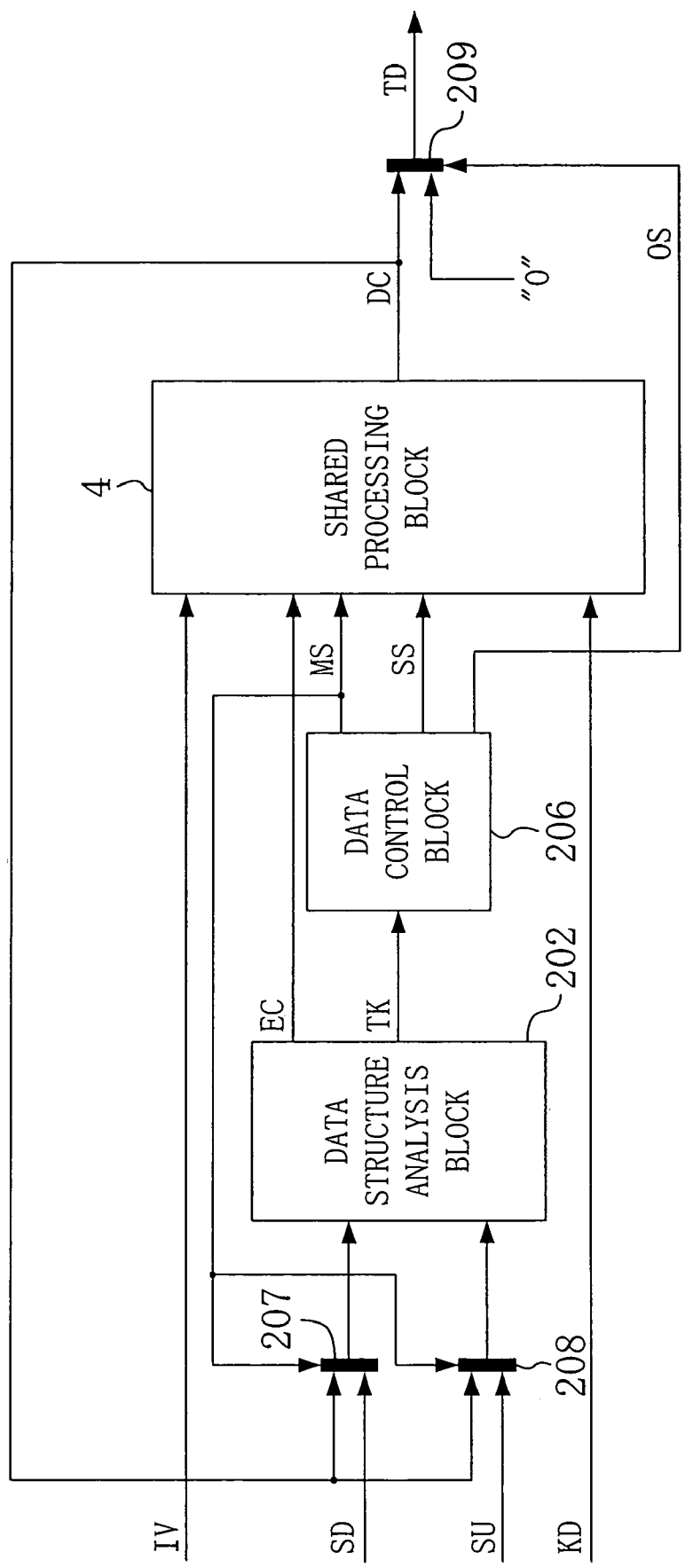
FIG. 5 is a block diagram of another exemplary encryption/decryption device of an embodiment of the present invention.

FIG. 5 is a block diagram of another exemplary encryption/decryption device of an embodiment of the present invention. The encryption/decryption device of FIG. 5 includes a data structure analysis block 202, a shared processing block 4, a data control block 206, first and second input selectors 207 and 208, and an output selector 209. The encryption/decryption device of FIG. 5 is a device for performing encryption and decryption by a triple DES scheme. The shared processing block 4 is the same as that described above with reference to FIG. 1.

The data structure analysis block 202 performs the same operation as the data structure analysis block 2 in FIG. 1, and, in addition to this, determines whether or not input stream data should be processed by the triple DES scheme from the header of the stream data and outputs the result to the data control block 206 as part of the TEK control data TK.

The data control block 206 performs the same operation as the data control block 6 in FIG. 1, and, in addition to this, outputs a signal indicating the triple DES mode to the shared processing block 4 and the input selectors 207 and 208 as part of the mode selection signal MS if the TEK control data TK indicates that encryption or decryption should be performed by the triple DES scheme. Also, the data control block 206 outputs an output control signal OS to the output selector 209.

The input selector 207 selects downstream data SD or processed data DC output from the shared processing block 4 according to the mode selection signal MS, and outputs the selected data to the data structure analysis block 202. The input selector 208 selects upstream data SU or the processed data DC according to the mode selection signal MS, and outputs the selected data to the data structure analysis block 202. The output selector 209 selects the processed data DC or "0" according to the output control signal OS, and outputs the result as processed data TD of the encryption/decryption device of FIG. 5.

The operation of the encryption/decryption device of FIG. 5 in the triple DES mode will be described. Normally, the data control block 206 outputs the mode selection signal MS to the input selectors 207 and 208 so that the input selectors respectively select the downstream data SD and the upstream data SU, and outputs the output control signal OS to the output selector 209 so that the output selector selects the processed data DC.

The shared processing block 4 performs first processing for the input downstream data SD or upstream data SU, and outputs the processed data DC to the input selectors 207 and 208 and the output selector 209.

If the mode selection signal MS indicates the triple DES mode, the input selectors 207 and 208 select the processed data DC. At this time, the output selector 209 selects "0" according to the output control signal OS. This indicates that the processed data DC subjected to the first processing by the shared processing block 4 is input again into the data structure analysis block 202 and is subjected to second processing by the shared processing block 4.

The input selectors 207 and 208 and the output selector 209 then repeat the same selection. Therefore, the processed data DC subjected to the second processing by the shared processing block 4 is input once again into the data structure analysis block 202 and is subjected to third processing by the shared processing block 4.

Once the third processing is finished, the output selector 209 selects the processed data DC, and thus the result of the encryption or decryption by the triple DES scheme is output as the processed data TD. At this time, the input selectors 207 and 208 respectively select the downstream data SD and the upstream data SU. Either of encryption and decryption can be performed as each of the three times of processing by the shared processing block 4. In particular, triple DES encryption is attained by performing the processing in the order of encryption, decryption and encryption, and triple DES decryption is attained by performing the processing in the order of decryption, encryption and decryption.

As described above, the encryption/decryption device of FIG. 5, which performs encryption or decryption three times in the shared processing block 4, can perform triple DES encryption or decryption.

The processing by the shared processing block 4 may be made by a larger number of times than three times.

Figure 6:
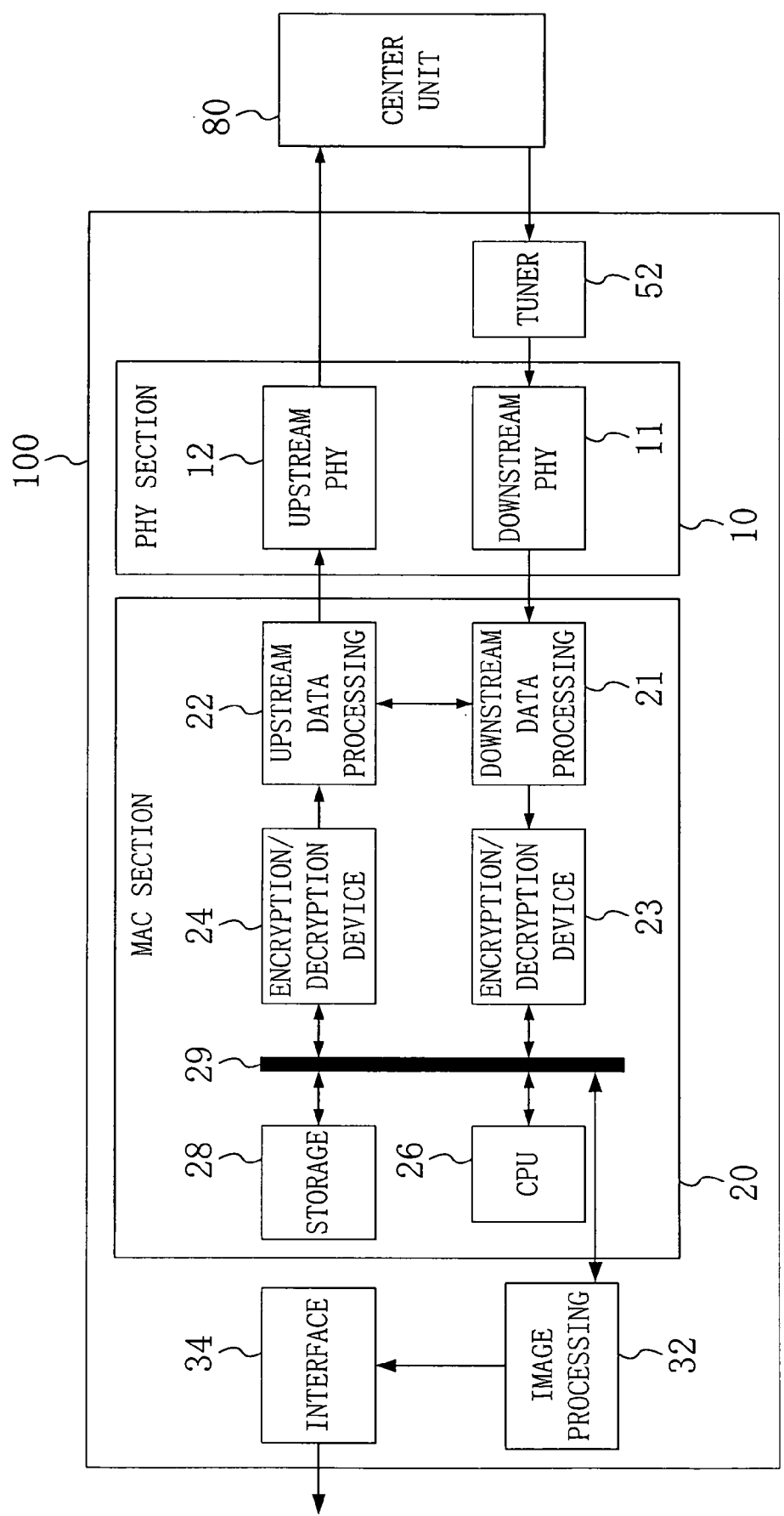
FIG. 6 is a block diagram of a transmission/reception apparatus using the encryption/decryption device of FIG. 1.

FIG. 6 is a block diagram of a transmission/reception apparatus 100 using the encryption/decryption device of FIG. 1. The transmission/reception apparatus 100 of FIG. 6 includes a PHY section 10, a MAC section 20, an image processing section 32, an interface section 34 and a tuner 52.

The PHY section 10 includes a downstream PHY section 11 and an upstream PHY section 12. The MAC section 20 includes a downstream data processing section 21, an upstream data processing section 22, encryption/decryption devices 23 and 24, a CPU 26 and a storage section 28. Both the encryption/decryption devices 23 and 24 are the same as the encryption/decryption device of FIG. 1. Alternatively, the encryption/decryption device of FIG. 5 may be used as the encryption/decryption devices 23 and 24.

In reception, the tuner 52 selects one channel from channels used for transmission, converts a signal transmitted from a center unit 80 into a low-frequency signal, and outputs the result to the downstream PHY section 11. The downstream PHY section 11 converts the received signal into a baseband signal, performs further conversion to data and error correction, and outputs the resultant data to the downstream data processing section 21.

The downstream data processing section 21 separates downstream data SD, key data KD, initial vector data IV and the like from the received data according to information in the header of the data, and outputs the results to the encryption/decryption device 23. The encryption/decryption device 23 decrypts a cipher in the manner described above with reference to FIG. 1, and outputs the resultant processed data DC to a bus 29. The processed data DC is stored in the storage section 28 via the bus 29 under control of the CPU 26.

The CPU 26 reads data from the storage section 28 and supplies the data to the image processing section 32. The image processing section 32 performs processing necessary for displaying the received data as an image, and outputs the resultant data to a display (not shown) via the interface section 34 for display.

In transmission, the CPU 26 reads data from the storage section 28, and supplies the data to the encryption/decryption device 24 via the bus 29 as upstream data SU. The encryption/decryption device 24 encrypts the received data in the manner described with reference to FIG. 1, and outputs the resultant processed data DC to the upstream data processing section 22. The upstream data processing section 22 performs processing such as adding a header for the received data, and outputs the result to the upstream PHY section 12. The upstream PHY section 12 converts the received data into an electric signal, further converts the signal to have a frequency used for transmission, and outputs the resultant signal to the center unit 80.

As described above, the transmission/reception apparatus of FIG. 6, which performs encryption in a plurality of modes or decryption in a plurality of modes with the same hardware, can reduce its circuit scale.

INDUSTRIAL APPLICABILITY

The encryption/decryption device and method of the present invention can provide many functions at low cost, and is useful for encryption and decryption in transmission/reception apparatuses, data recording/reproduction apparatuses and the like.

The invention claimed is:

1. An encryption/decryption device comprising:
a data structure analysis block for receiving encrypted data or data to be encrypted, analyzing the structure of the data and outputting information related to encryption as control data, the data structure analysis block also outputting the encrypted data or the data to be encrypted as processing block input data;
a data control block for outputting an encryption/decryption switch signal indicating which one of encryption and decryption should be performed, and a mode selection signal indicating in which mode the processing block input data should be processed, according to the control data; and
a shared processing block configured to have the ability to perform encryption and decryption in either of the Cipher Block Chaining (CBC) mode and the Cipher Feedback (CFB) mode by performing Electronic Code Book (ECB) processing using input key data, the shared processing block performing encryption or decryption according to the encryption/decryption switch signal for the processing block input data in the mode indicated by the mode selection signal, and outputting encrypted result or decrypted result,
wherein the shared processing block comprises:
an ECB processor for performing the ECB processing and outputting the result as cipher-processed data;
a first selector for selecting one of the processing block input data and the cipher-processed data according to the encryption/decryption switch signal and the mode selection signal, and outputting the selected data;
a delay device for delaying the processing block input data and the cipher-processed data received as inputs and outputting the delayed data;
a second selector for selecting one of the processing block input data, initial vector data, and the delayed processing block input data and the delayed cipher-processed data output from the delay device according to the encryption/decryption switch signal and the mode selection signal, and outputting the selected data;
an XOR operator for computing XOR of the output of the first selector and the output of the second selector and outputting the computed result;
a third selector for selecting one of the processing block input data, the output of the XOR operator, the delayed processing block input data and the delayed cipher-processed data according to the encryption/decryption switch signal and the mode selection signal, and outputting the selected data;

a bit mask device for masking part of the key data as required according to the mode selection signal and outputting the result as mode-adaptive key data; and a fourth selector for selecting one of the cipher-processed data and the output of the XOR operator according to the encryption/decryption switch signal and the mode selection signal, and outputting the selected data as the encrypted result or the decrypted result, and the ECB processor performs either encryption or decryption as the ECB processing for the output of the third selector using the mode-adaptive key data according to the encryption/decryption switch signal and the mode selection signal, and outputs the result as the cipher-processed data.

2. The encryption/decryption device of claim 1, wherein the data structure analysis block analyzes a header of the encrypted data to draw out a Media Access Control (MAC) structure from the encrypted data based on information in the header, and if an extension header exists in the MAC structure and the extension header indicates that the encrypted data has been encrypted, the data structure analysis block outputs information related to encryption included in the extension header as the control data, and also removes the extension header from the MAC structure data and outputs the result as the processing block input data.

3. The encryption/decryption device of claim 1, wherein the data control block outputs a signal indicating in which mode, the CBC mode or the CFB mode, the processing block input data should be processed and in which key data length mode the data should be processed, as the mode selection signal, according to the control data.

4. The encryption/decryption device of claim 1, wherein the bit mask device outputs the key data as it is if the mode selection signal indicates a 56-bit key mode, or otherwise masks unnecessary bits and outputs the resultant data, as the mode-adaptive key data.

5. The encryption/decryption device of claim 1, wherein the first selector selects the processing block input data if the encryption/decryption switch signal indicates encryption and the mode selection signal indicates the CBC mode, or otherwise selects the cipher-processed data, and outputs the selected data.

6. The encryption/decryption device of claim 1, wherein the second selector selects the initial vector data at start of processing and thereafter selects the delayed cipher-processed data if the encryption/decryption switch signal indicates encryption and the mode selection signal indicates the CBC mode, and outputs the selected data, selects the initial vector data at start of processing and thereafter selects the processing block input data if the encryption/decryption switch signal indicates encryption and the mode selection signal indicates the CFB mode, and outputs the selected data, selects the initial vector data at start of processing and thereafter selects the delayed processing block input data if the encryption/decryption switch signal indicates decryption and the mode selection signal indicates the CBC mode, and outputs the selected data, or selects the initial vector data at start of processing and thereafter selects the processing block input data if the encryption/decryption switch signal indicates decryption and the mode selection signal indicates the CFB mode, and outputs the selected data.

7. The encryption/decryption device of claim 1, wherein the third selector selects the output of the XOR operator if the encryption/decryption switch signal indicates encryption and the mode selection signal indicates the CBC mode, and outputs the selected data, selects the processing block input data at start of processing and thereafter selects the delayed cipher-processed data if the encryption/decryption switch signal indicates encryption and the mode selection signal indicates the CFB mode, and outputs the selected data, selects the processing block input data if the encryption/decryption switch signal indicates decryption and the mode selection signal indicates the CBC mode, and outputs the selected data, or selects the processing block input data at start of processing and thereafter selects the delayed processing block input data if the encryption/decryption switch signal indicates decryption and the mode selection signal indicates the CFB mode, and outputs the selected data.

8. The encryption/decryption device of claim 1, wherein the fourth selector selects the cipher-processed data if the encryption/decryption switch signal indicates encryption and the mode selection signal indicates the CBC mode, and outputs the selected data, selects the output of the XOR operator if the encryption/decryption switch signal indicates encryption and the mode selection signal indicates the CFB mode, and outputs the selected data, or selects the output of the XOR operator if the encryption/decryption switch signal indicates decryption, and outputs the selected data.

9. The encryption/decryption device of claim 1, wherein the ECB processor performs encryption if the encryption/decryption switch signal indicates encryption, performs decryption if the encryption/decryption switch signal indicates decryption and the mode selection signal indicates the CBC mode, or performs encryption if the encryption/decryption switch signal indicates decryption and the mode selection signal indicates the CFB mode.

10. An encryption/decryption device comprising:

a data structure analysis block for receiving encrypted data or data to be encrypted, analyzing the structure of the data and outputting information related to encryption as control data, the data structure analysis block also outputting the encrypted data or the data to be encrypted as processing block input data;

a data control block for outputting an encryption/decryption switch signal indicating which one of encryption and decryption should be performed, and a mode selection signal indicating in which mode the processing block input data should be processed, according to the control data;

a shared processing block configured to have the ability to perform encryption and decryption in either of the CBC mode and the CFB mode by performing ECB processing using input key data, the shared processing block performing encryption or decryption according to the encryption/decryption switch signal for the processing block input data in the mode indicated by the mode selection signal, and outputting encrypted result or decrypted result;

a first input selector for selecting encrypted data or the output of the shared processing block and outputting the selected data to the data structure analysis block;

a second input selector for selecting data to be encrypted or the output of the shared processing block and outputting the selected data to the data structure analysis block; and an output selector for selecting a predetermined value or the output of the shared processing block and outputting the selected data, wherein once processing in the shared processing block is performed for the encrypted data or the data to be encrypted for a predetermined number of times, the output selector selects the output of the shared processing block.

11. The encryption/decryption device of claim 10, wherein the predetermined number of times is three times.

12. An encryption device comprising:

a data structure analysis block for receiving data to be encrypted, analyzing the structure of the data to determine control data and outputting the control data, the data structure analysis block also outputting the data to be encrypted as processing block input data;

a data control block for outputting a mode selection signal indicating in which mode the processing block input data should be processed, according to the control data; and a shared processing block configured to have the ability to perform encryption in either of the CBC mode and the CFB mode by performing ECB processing using input key data, the shared processing block performing encryption for the processing block input data in the mode indicated by the mode selection signal and outputting encrypted result, wherein the shared processing block comprises:

an ECB processor for performing the ECB processing and outputting the result as cipher-processed data;

a first selector for selecting one of the processing block input data and the cipher-processed data according to the mode selection signal, and outputting the selected data;

a delay device for delaying the cipher-processed data received as an input and outputting the delayed data;

a second selector for selecting one of the processing block input data, initial vector data and the delayed cipher-processed data output from the delay device according to the mode selection signal, and outputting the selected data;

an XOR operator for computing XOR of the output of the first selector and the output of the second selector and outputting the computed result;

a third selector for selecting one of the processing block input data, the output of the XOR operator and the delayed cipher-processed data according to the mode selection signal, and outputting the selected data;

a bit mask device for masking part of the key data as required according to the mode selection signal and outputting the result as mode-adaptive key data; and a fourth selector for selecting one of the cipher-processed data and the output of the XOR operator according to the mode selection signal, and outputting the selected data as the encrypted result, and the ECB processor performs encryption as the ECB processing for the output of the third selector using the mode-adaptive key data, and outputs the result as the cipher-processed data.

13. A decryption device comprising:

a data structure analysis block for receiving encrypted data, analyzing the structure of the data and outputting information related to encryption as control data, the data structure analysis block also outputting the encrypted data as processing block input data;

a data control block for outputting a mode selection signal indicating in which mode the processing block input data should be processed, according to the control data; and a shared processing block configured to have the ability to perform decryption in either of the CBC mode and the CFB mode by performing ECB processing using input key data, the shared processing block performing decryption for the processing block input data in the mode indicated by the mode selection signal and outputting decrypted result, wherein the shared processing block comprises:

an ECB processor for performing the ECB processing and outputting the result as cipher-processed data;

a delay device for delaying the processing block input data received as an input and outputting the delayed data;

a second selector for selecting one of the processing block input data, initial vector data and the delayed processing block input data output from the delay device according to the mode selection signal, and outputting the selected data;

an XOR operator for computing XOR of the cipher-processed data and the output of the second selector and outputting the computed result;

a third selector for selecting one of the processing block input data and the delayed processing block input data according to the mode selection signal, and outputting the selected data; and a bit mask device for masking part of the key data as required according to the mode selection signal and outputting the result as mode-adaptive key data, and the ECB processor performs either encryption or decryption as the ECB processing for the output of the third selector using the mode-adaptive key data according to the mode selection signal, and outputs the result as the cipher-processed data.

* * * * *